F. H. BUCKINGHAM.
SCALE.
APPLICATION FILED MAR. 31, 1917.
1,347,206.
Patented July 20, 1920.
2 SHEETS—SHEET 1.
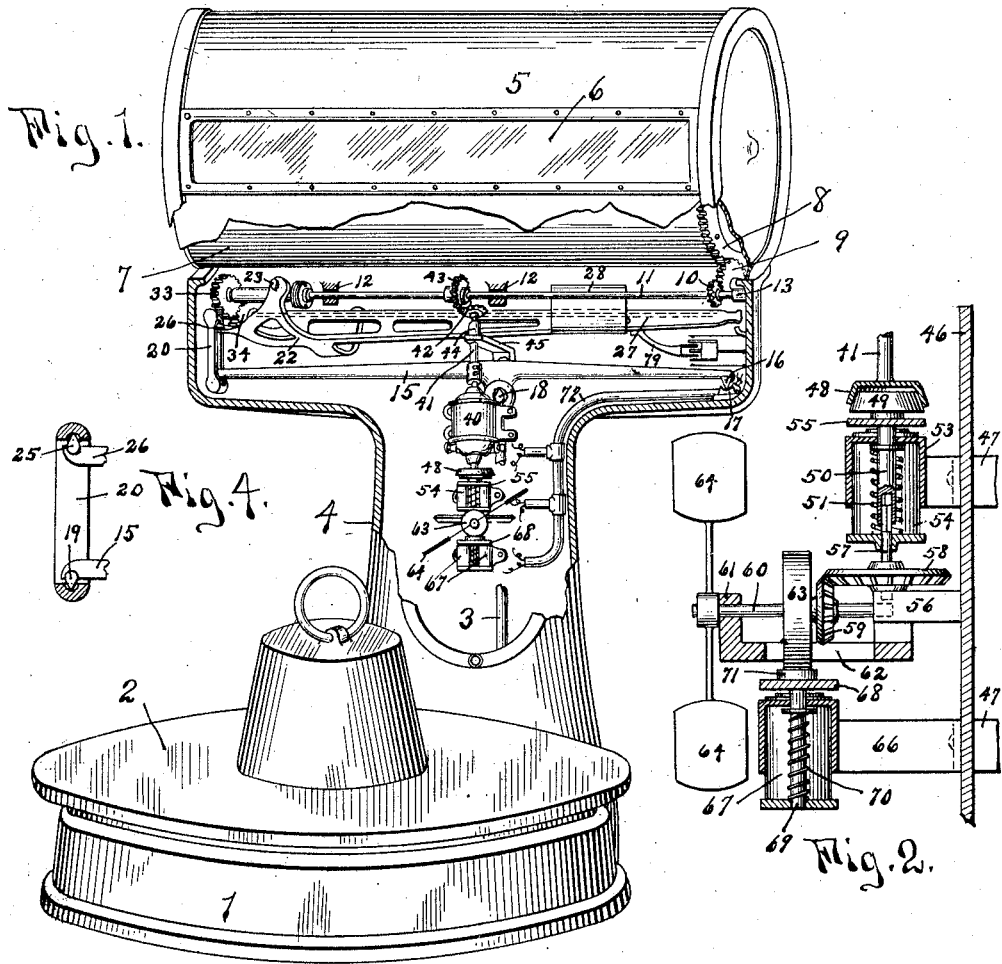
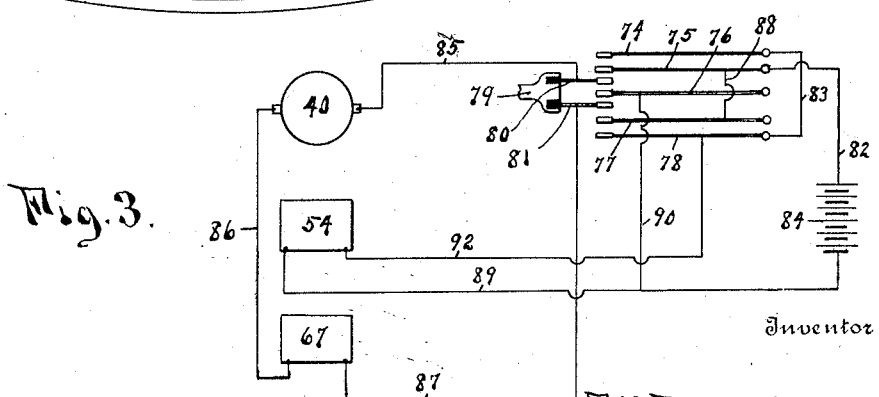
Inventor
F. H. Buckingham,
By Pagelsen and Spencer
Attorneys F. H. BUCKINGHAM.
SCALE.
APPLICATION FILED MAR. 31, 1917.
1,347,206.
Patented July 20, 1920.
2 SHEETS—SHEET 2.
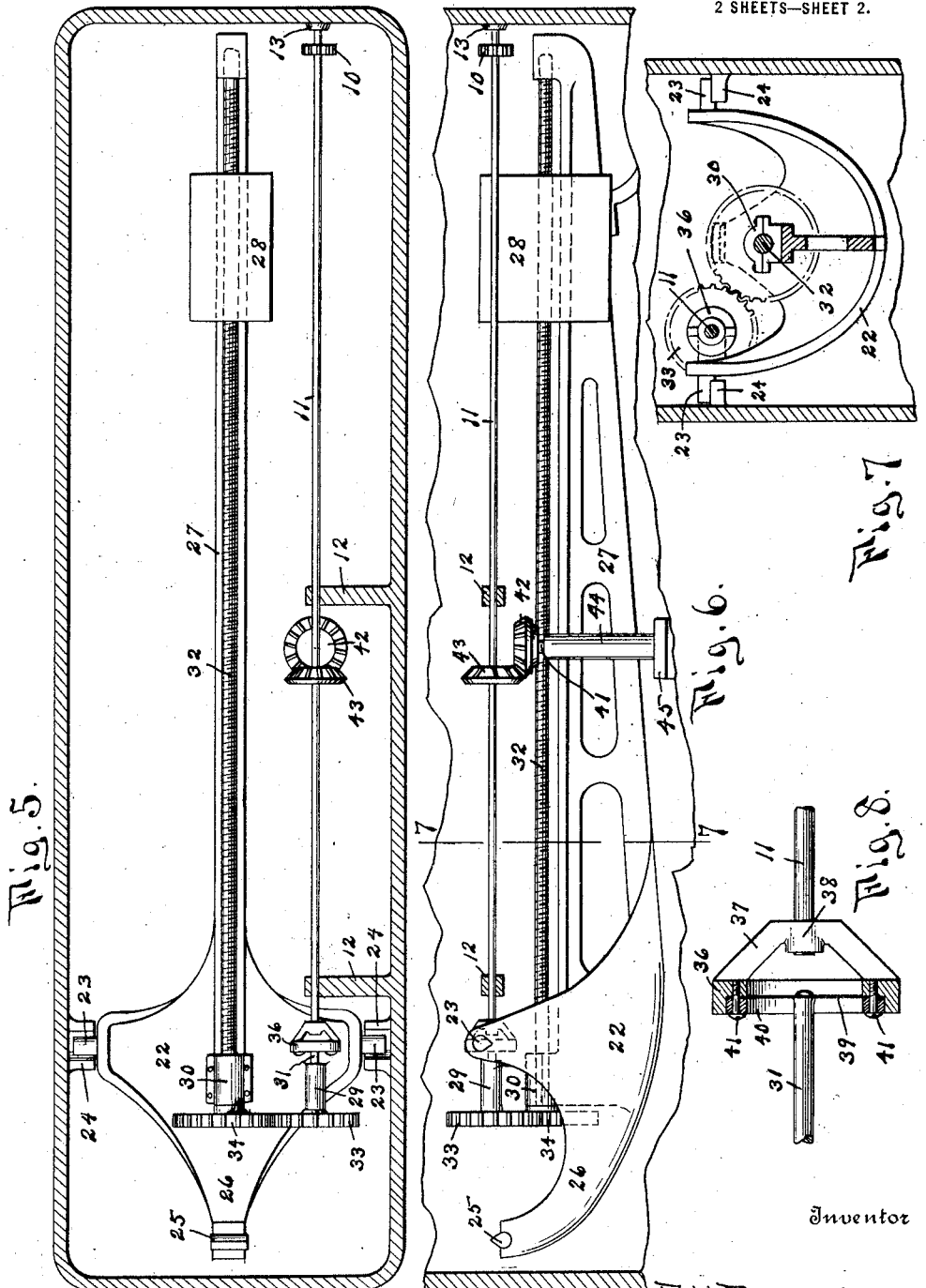
Inventor
F. H. Buckingham
By Pagelsen and Spencer
Attorneys

UNITED STATES PATENT OFFICE.

FREMONT H. BUCKINGHAM, OF DETROIT, MICHIGAN, ASSIGNOR TO THE STANDARD COMPUTING SCALE COMPANY, OF DETROIT, MICHIGAN, A CORPORATION OF MICHIGAN.

SCALE.

1,347,206.  Specification of Letters Patent.  Patented July 20, 1920.

Application filed March 31, 1917. Serial No. 158,819.

*To all whom it may concern:*

Be it known that I, FREMONT H. BUCKINGHAM, a citizen of the United States, and residing at Detroit, in the county of Wayne and State of Michigan, have invented a new and Improved Scale, of which the following is a specification.

This invention relates to means for counter-balancing loads on the load receiving mechanism of weighing scales, and its object is to provide an effective load resisting and weight indicating mechanism which may be entirely incased and operated manually or automatically to correctly indicate the weight or the weight and value of the load.

This invention consists in the combination of a pivoted weighing beam and the poise slidable thereon, of a poise actuating mechanism mounted on the beam and in engagement with the poise to move the poise longitudinally of the beam, a stationary shaft and a flexible joint between the shaft and screw and so positioned that the extended axes of the shaft and of the screw will at all times pass through the fulcrum line of the beam. It also consists in addition to the above described mechanism of an automatically controlled motor for actuating the shaft to turn the screw to move the poise in either direction to cause it to counterbalance the load on the scale at all times. It further consists in automatic speed controlling means to reduce the speed of the motor as the poise approximates its load-balancing position.

In the accompanying drawings, Figure 1 is a perspective view of the scale with a portion of the pedestal broken away to show the operating mechanism. Fig. 2 is a vertical section of the speed control mechanism at right angles to the plane of the beam. Fig. 3 is a diagram of the electric circuits. Fig. 4 is a detail of a link. Fig. 5 is a plan of the beam and the driving mechanism for the poise. Fig. 6 is an elevation of the same. Fig. 7 is a section on the line 7—7 of Fig. 6. Fig. 8 is a central longitudinal section of a universal joint.

Similar reference characters refer to like parts throughout the several views.

The load receiving levers of this scale may be of any desired construction. They are mounted within the base 1 and support the platform 2, while the stress of the load is transmitted to the vertically movable rod 3 that extends up into a pedestal 4 on which the drum case 5 is supported. This case is provided with a window 6 through which the weight or value figures on a revoluble indicating drum 7 may be read. This drum is shown connected to a gear ring 8 that meshes with an idler gear 9 also meshing with the pinion 10 on the shaft 11 that is mounted in bearings 12 and 13 as shown in Fig. 5. Any other weight or value indicator may be employed.

The upper end of the pedestal is extended laterally longitudinally of and just below the drum case, and in this upper end are shown mounted a lever and a beam. The lever 15 has a fulcrum 16 at one end mounted in the bearing 17, a load receiving pivot 18 intermediate its ends to which the rod 3 connects, and a work pivot 19 at its opposite end, which pivot engages a link 20.

The beam 22 has a fulcrum in the form of two knife edges 23 in alinement with each other supported by the bearings 24, and a pivot 25 at the end of its arm 26. This pivot 25 also engages the link 20 and receives the pull of the load. The arm 27 of the beam is parallel to or in a line connecting the pivots 23 and 25 and on this arm a poise 28 is slidable. This beam also carries the bearings 29 and 30, the former for the short shaft 31 and the latter for the screw 32.

On one end of the short shaft 31 is a gear 33 that meshes with the gear 34 on the screw 32. The other end of this short shaft is connected to the main shaft 11 by means of a universal joint or coupling of any desirable construction, the center of the joint being in the line of the axis of the fulcrum of the beam. The screw 32 engages the poise 28 and moves it back and forth on the beam as the screw is rotated. It will be noted that the connection between the mechanism on the beam and the driving mechanism which is mounted on the stationary portions of the scale must always be concentric with the line of the fulcrum of the beam, no matter how the construction of these parts is varied.

The universal joint shown in Fig. 8 consists of a ring 36 connected to one shaft by means of the arms 37 and the collar 38, a disk 39 of thin flexible metal, preferably steel, rigidly connected to the end of the other shaft and rigidly connected at its edge to the ring 36 in any desired manner such as by means of a washer 40 and screws 41. The thin flexible disk 39 will transmit rotary motion from one shaft to the other and will permit angular movement between the shafts with the least amount of friction. The center of this joint will be the point where the plane of the disk crosses the axis of the shaft to which the disk is attached and is in the line of the fulcrum of the beam 22.

Any desired type of driving mechanism may be employed to turn the screw 32, either manually or automatically. The preferred mechanism is a reversible electric motor 40 whose armature shaft 41 carries a bevel gear 42 that meshes with the bevel gear 43 on the shaft 11. The shaft 41 is preferably guided in the bearing 44 carried by the bracket 45.

The motor 40 is preferably secured to a plate 46 carried by posts 47 projecting forward from the back of the pedestal 4. At the lower end of the armature shaft may be secured a female member 48 of a clutch into which the male member 49 on the shaft 50 may be forced by means of the spring 51 shown in Fig. 2. This shaft 50 is journaled in the bracket 53 that carries any desired type of electro-magnet 54. A disk 55 secured to the shaft 50 is the armature of this magnet. A bracket 56 on the plate 46 carries the lower end of a short shaft 57 whose upper end is rotatable with but slidable in the lower end of the shaft 50 so as to permit the shaft 50 to be moved up and down. This second shaft carries a bevel gear 58 that meshes with the gear 59 secured to the shaft 60, which is journaled in a bearing 61 carried by the bracket 62 and also in the bracket 57. On this shaft 60 is secured a brake wheel 63 and the vanes 64 of the usual speed—regular type.

A bracket 66 projects from the plate 46 and carries the electro-magnet 67 whose armature 68 is secured to the short shaft 69, normally held up by the spring 70 and having a brake shoe 71 at its upper end adapted to engage the wheel 63. The wires leading to the motor and to these electro-magnets may be carried through the tubes 72.

Mounted within the pedestal are a series of resilient contact-carrying springs 74, 75, 76, 77 and 78, and mounted on the end of the arm 27 is a finger 79 which carries a pair of connected contacts 80 and 81. The wire 82 from the battery 84 or other current source connects to the contact 75. The wire 83 connects the contacts 74 and 78. The wire 85 connects the contact 80 to the motor 40, the wire 86 connects the motor to the lower or brake controlling magnet 67, while the wire 87 connects this magnet to the contact 81 on the beam. The wire 88 connects the contacts 75 and 77, the wires 89 and 90 connect the magnet 54 and the contact 76 to the battery, and the wire 92 connects the magnet 54 to the contact 78.

When the beam is central, no current will pass to the motor or magnets. When a load on the platform causes the outer end of the beam to swing up enough to cause the contacts 80—75 and 81—76 to engage, current will pass over wire 82, contacts 75 and 80, and wire 85 to the motor, energizing it to turn the screw 32 to move the poise 28 toward the outer end of the beam. The current passes over the wire 86 to the magnet 67 to cause it to pull down the brake-shoe 71 to permit the armature shaft of the motor and the shafts connected thereto to turn at a speed regulated by the vanes 64. From the magnet 67 the current passes over the wire 87 to the contacts 81 and 76 and thence over the wire 90 to the battery.

The magnet 67 will be energized and deenergized simultaneously with the motor, and the brake will be applied as soon as the motor is deënergized.

The magnet 54 is energized whenever the load on the platform forces up the outer end of the beam sufficiently to cause the contact 75 to swing up against the contact 74. Current will then pass by way of the contact 74, wire 83, contact 78 and wire 92 to the magnet 54 and over the wire 89 to the battery. When the magnet 54 is energized, the male member 49 of the clutch will be withdrawn from the female member and the speed controlling vanes 64 will be disconnected from the motor, which will run at high speed to move the poise 28 out toward the end of the beam. This continues until the load is sufficiently counter-balanced to permit the beam to swing down enough to break the engagement between the contacts 74 and 75.

This mechanism therefore provides for rapid movement of the poise on the beam whenever the outer end of the beam is held up or down sufficiently to cause the two upper or two lower contacts to engage, the speed controller being caused to operate to slow down the motor by means of the spring 51 when the beam approximates the horizontal position.

When the end of the beam is down, the current passes over wire 82, contact 75, wire 88, contacts 77 and 81, wire 87 to the magnet 67, wire 86 to the motor, wire 85, contacts 80 and 76, and wire 90 to the battery. The current energizes the motor and causes it to turn in the opposite direction from that before described and to move the poise inward toward the fulcrum of the beam.

The wires leading from the motor and from the brake releasing magnet to the contacts 80 and 81 on the beam will be so long and flexible that no resistance will be offered to the movements of the beam. The details of this wiring system may be varied if desired as it forms no part of the present invention. By mounting the motor on a stationary part of the scale where weight is unobjectionable, the beam and the parts mounted thereon, excepting the poise, may be made very light and thus reduce friction. The drum being driven by an independent stationary shaft no stress will be transferred to the beam therefrom. The lever 15 is desirable when this invention is embodied in a scale wherein the indicating drum is mounted on a central column or pedestal but the invention would be as fully carried out if the load-resisting rod 3 were in alinement with the link 20 and the lever 15 omitted.

I claim:—

1. In a load-resisting mechanism for scales, the combination of a beam and a fulcrum therefor, a poise slidable on the beam, a screw mounted on the beam for positioning the poise on the beam, an operating device for the screw, and connections including a flexible coupling between said device and the screw permitting the screw and beam to swing substantially without friction.

2. In a load-resisting mechanism for scales, the combination of a beam and a fulcrum therefor, a poise slidable on the beam, means on the beam for positioning the poise on the beam, an operating device, and connections including a flexible coupling between the operating device and the poise-positioning means permitting the beam and poise to swing substantially without friction.

3. In a scale, the combination of a vertically movable rod, a lever connected intermediate its ends to said rod, a beam and a poise slidable thereon, a connection between the lever and beam through which the weight of the poise may resist the load on said rod, means mounted on said beam to move said poise, mechanism mounted on a stationary support to actuate said means and means to operatively connect said poise actuating means and mechanism, said connecting means embracing a universal coupling concentric with the fulcrum of the lever.

4. In a scale, the combination of a longitudinally movable rod, a lever connected intermediate its ends to said rod, a beam fulcrumed intermediate its ends and a poise slidable on the beam, a link connecting one end of the lever to an arm of the beam, a screw mounted on the beam to move the poise, a shaft mounted on a stationary support, and a universal joint connecting the shaft and screw.

5. In a scale, the combination of a beam fulcrumed intermediate its ends, a poise slidable on the beam, means to apply a load to one end of the beam, a screw mounted on the beam and engaging the poise, a shaft mounted on a stationary support, and a universal joint connecting the shaft and screw, the center of the joint being in the line of the fulcrum of the beam.

6. In a scale, the combination of a beam fulcrumed intermediate its ends, a poise slidable on the beam means to apply a load to one end of the beam, a screw mounted on the beam and engaging the poise, a shaft mounted on a stationary support, a universal joint connecting the shaft and screw, a reversible electric motor, means connecting said motor to said shaft whereby the screw may be turned in either direction by said motor, a plurality of contacts mounted on the beam and a series of stationary contacts adapted to be engaged thereby, and electrical connections controlled by said contacts for conducting an electric current in either direction to said motor.

7. In a scale, the combination of a beam fulcrumed intermediate its ends, a poise slidable on the beam, means to apply a load to one end of the beam, means mounted on the beam and engaging said poise to move it longitudinally of the beam, a rotatable shaft mounted adjacent said beam, means connecting said shaft to the load actuating means on the beam, a reversible electric motor to actuate the shaft, contacts on said beam and on a stationary support adjacent thereto, electrical connections controlled by said contacts for conducting currents in either direction to said motor, a speed controller for said motor, a clutch connecting said motor to said speed controller, and electrical means controlled by said contacts for governing the action of said clutch.

8. In a scale, the combination of a beam fulcrumed intermediate its ends, a poise slidable on the beam, means to apply a load to one end of the beam, means mounted on the beam and engaging said poise to move the same longitudinally of the beam, a rotatable shaft mounted adjacent said beam, means connecting said shaft and the poise moving means on the beam, a reversible electric motor to actuate the shaft, contacts on said beam and on a stationary support adjacent thereto, electrical connections controlled by said contacts for conducting currents in either direction to said motor, a speed controller for said motor, a clutch connecting said motor to said speed controller, electrical means controlled by said contacts for governing the action of said clutch, a brake mechanism for said motor, and electrical means controlled by said contacts for rendering said brake inoperative.

9. In a scale, the combination of a case, a weight indicator mounted therein, a beam fulcrumed intermediate its ends, a poise slidable on the beam, means to apply a load to one end of said beam, a screw mounted on the beam and engaging the poise, a shaft mounted on a stationary support, a connection between said shaft and said screw whereby the screw may be turned in either direction by said shaft to move the poise, a series of contacts mounted adjacent the beam, a plurality of contacts mounted on said beam, a reversible electric motor to actuate the shaft, electrical connections controlled by said contacts to conduct electric current in either direction to said motor, means connecting said shaft to said weight indicator whereby the weight indicator will be moved in either direction simultaneously with the poise.

10. In a scale, the combination of a support and a beam fulcrumed intermediate its ends on the support, a weight resisting link connected to one arm of the beam, a poise slidable on the other arm to resist the pull of said link, means mounted on the beam to slide the poise back and forth, a shaft to actuate the screw, a weight indicating drum, a motor, independent connections between the poise actuating shaft and the motor and between the drum and the motor, means to control the speed of the motor, and means governed by said beam for rendering the speed controller inoperative.

FREMONT H. BUCKINGHAM.